(12) United States Patent
Achour

(10) Patent No.: US 10,446,927 B2
(45) Date of Patent: Oct. 15, 2019

(54) INTELLIGENT ANTENNA METAMATERIAL METHOD AND APPARATUS

(71) Applicant: Metawave Corporation, Palo Alto, CA (US)

(72) Inventor: Maha Achour, Encinitas, CA (US)

(73) Assignee: Metawave Corporation, Palo Alto, CA (US)

( * ) Notice: Subject to any disclaimer, the term of this patent is extended or adjusted under 35 U.S.C. 154(b) by 0 days.

(21) Appl. No.: 15/977,888

(22) Filed: May 11, 2018

(65) Prior Publication Data

US 2018/0351249 A1    Dec. 6, 2018

Related U.S. Application Data

(60) Provisional application No. 62/515,045, filed on Jun. 5, 2017.

(51) Int. Cl.
*H01Q 3/30* (2006.01)
*H01Q 25/00* (2006.01)
*H01Q 15/00* (2006.01)
*H01Q 1/32* (2006.01)
*H01Q 21/06* (2006.01)
*H01Q 21/28* (2006.01)

(52) U.S. Cl.
CPC ............. *H01Q 3/30* (2013.01); *H01Q 1/3233* (2013.01); *H01Q 15/0086* (2013.01); *H01Q 21/065* (2013.01); *H01Q 21/28* (2013.01); *H01Q 25/00* (2013.01)

(58) Field of Classification Search
CPC .... H01Q 15/0086; G01S 7/471; G01S 13/931
See application file for complete search history.

(56) References Cited

U.S. PATENT DOCUMENTS

| 6,492,949 | B1 | 12/2002 | Breglia et al. |
| 6,768,453 | B2 | 7/2004 | Solbach |
| 7,250,908 | B2 | 7/2007 | Lee |
| 8,633,866 | B2 * | 1/2014 | Sarabandi ............ H01Q 5/0053 343/909 |
| 8,754,810 | B2 | 6/2014 | Guo et al. |
| 9,545,923 | B2 * | 1/2017 | Casse .................... G01S 13/931 |
| 9,786,986 | B2 * | 10/2017 | Johnson .................. H01Q 3/26 |
| 2016/0011307 | A1 | 1/2016 | Casse et al. |

(Continued)

OTHER PUBLICATIONS

Guzman-Quiros, Raul et al. "Advances in Electronically Reconfigurable LWAs in Fabry-Pérot and SIW Technologies", 7th European Conference on Antennas and Propagation, EuCAP 2013. 2001-2005.

(Continued)

*Primary Examiner* — Jessica Han
*Assistant Examiner* — Amal Patel
(74) *Attorney, Agent, or Firm* — Sandy Godsey; Marcia Chang

(57) ABSTRACT

The present invention is a metamaterial-based object detection system. An intelligent antenna metamaterial interface (IAM) associates specific metamaterial unit cells into sub-arrays to adjust the beam width of a transmitted signal. The IAM is part of a sensor fusion system that coordinates a plurality of sensors, such as in a vehicle, to optimize performance. In one embodiment, an MTM antenna structure is probe-fed to create a standing wave across the unit cells.

18 Claims, 14 Drawing Sheets

(56) References Cited

U.S. PATENT DOCUMENTS

| | | |
|---|---|---|
| 2016/0013531 A1 | 1/2016 | Casse et al. |
| 2016/0061935 A1 | 3/2016 | McCloskey et al. |
| 2016/0134022 A1* | 5/2016 | Alexopoulos ...... H01Q 15/0006 |
| | | 343/834 |
| 2019/0074588 A1* | 3/2019 | Scarborough .......... H01Q 1/288 |

OTHER PUBLICATIONS

Wang, Yifu et al. "Tunable I-shaped metamaterial by loading varactor diode for reconfigurable antenna", Applied Physics A, May 26, 2011, 1243-1247.

Zhang, Miao et al. "Design of a Double-Layer Slotted Waveguide Array with, a Partialiy Corporate Feed Circuit Instalied in the Bottom Layer and its Fabrication by Diffusion Bonding of Laminated Thin Plates in 38GHz Band" The 2009 Internailonal Symposium on Antennas and Propogation, ISAP Oct. 20-23, 2009. 873-376.

\* cited by examiner

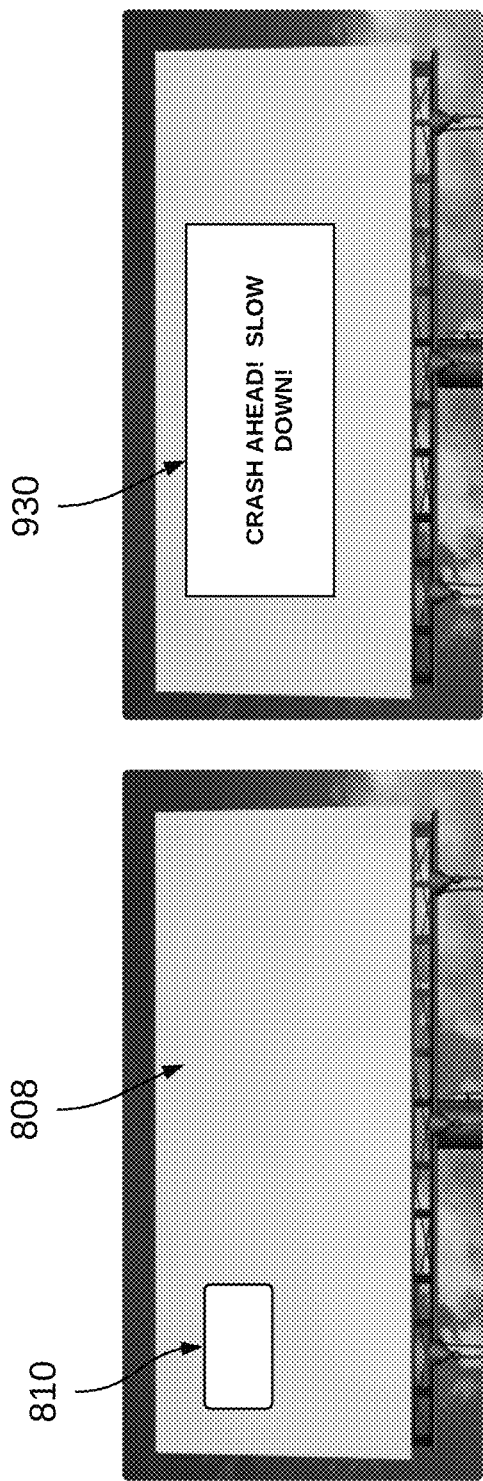
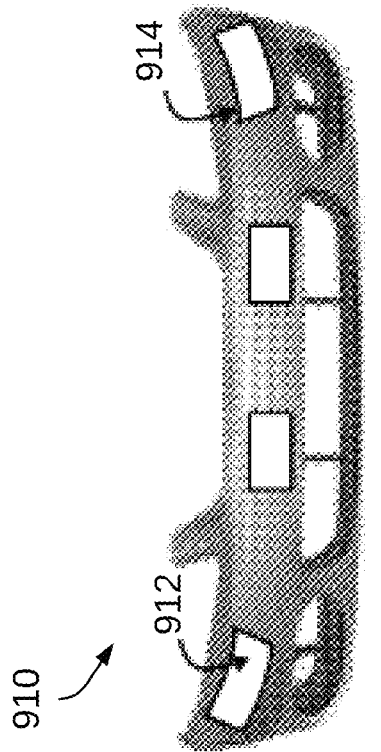
FIG. 9
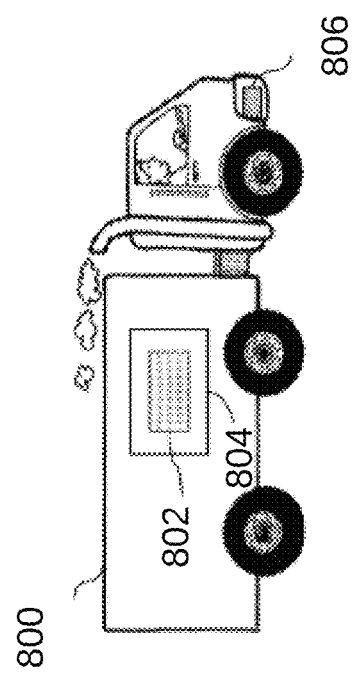
FIG. 8

THREE LAYER, PROBE FED MTM ANTENNA STRUCTURE

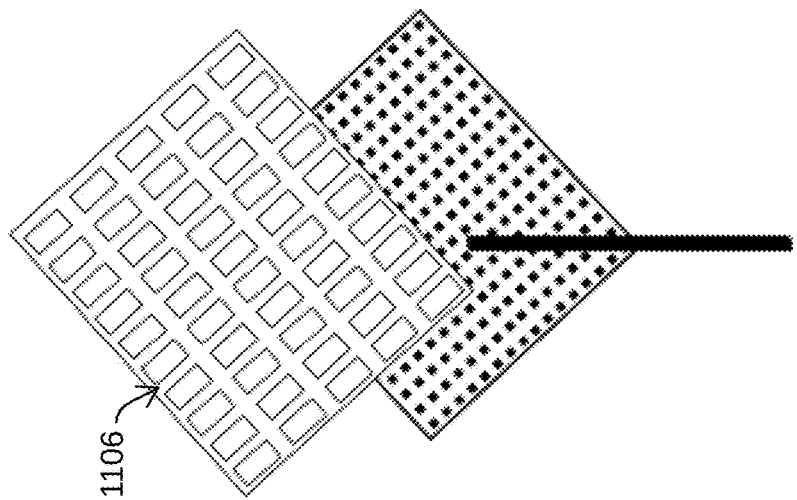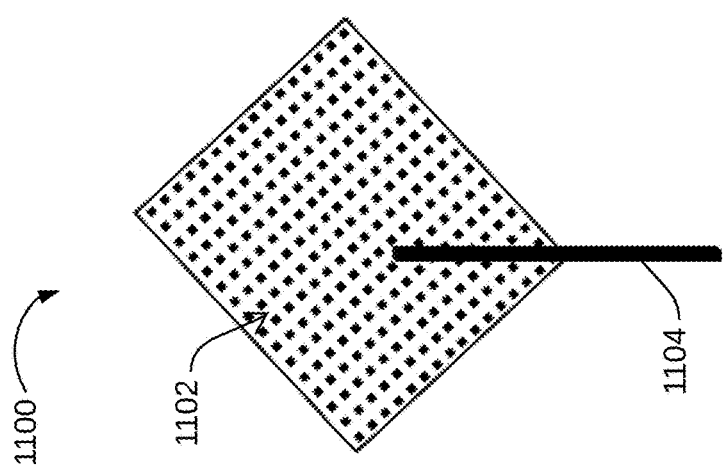
TWO LAYER, PROBE FED MTM ANTENNA STRUCTURE
FIG. 11

INTELLIGENT ANTENNA METAMATERIAL METHOD AND APPARATUS

CROSS-REFERENCE TO RELATED APPLICATIONS

This application claims priority to U.S. Provisional Application No. 62/515,045, filed on Jun. 5, 2017, and incorporated by reference herein.

FIELD OF THE INVENTION

The present invention relates to intelligent antennas using metamaterial structures using dynamic control of the metamaterial unit cells.

BACKGROUND

Antennas are used in everyday life for communication systems, sensing devices, radar systems and so forth. Recently there is attention given to autonomous, or self-driving, vehicles. The designs and products contemplated today do not consider all the weather conditions, power consumption constraints and timing required for effective control of a vehicle. There is a need to provide a sensing system that works over the range of road, weather, temperature, visibility, traffic conditions and so forth, while maintaining consistent reliable service.

BRIEF DESCRIPTION OF THE FIGURES

Embodiments of the present invention are described with respect to the figures. These are not drawn to scale and are drawn to clearly identify what applicant claims as the invention.

FIGS. 8 and 9 illustrate placement of metamaterial antenna system components, according to embodiments of the present invention.

FIGS. 10 and 11 illustrate probe-fed metamaterial antenna structures, according to embodiments of the present invention.

DETAILED DESCRIPTION

The present invention describes an antenna system having an antenna configured with metamaterial (MTM) cells and controlled by an Intelligent Antenna MTM interface (IAM). The antenna system may be used in applications including cellular communication networks, vehicle-to-vehicle communication systems, object detection systems, autonomous vehicle sensor systems, drone control and communication systems, and so forth. The MTM antenna structure is dynamically controlled by the IAM; control may be done by changing the electrical or electromagnetic configuration of the antenna structure. In some embodiments, varactors are coupled to the MTM antenna structure to enable adjustment of the radiation pattern. In some embodiments, the MTM unit cells may be configured into subarrays that have specific characteristics. For use in an autonomous vehicle, the system may perform a coarse focus with a large beam width as an ambient condition, and then narrow the beam width when an echo is received, indicating an object is within the field of view of the antenna structure's radiation pattern. In this way, the larger beam width may sweep the full Field of View (FoV) of the antenna structure, reducing the time to scan the FoV. In some embodiments, the IAM is able to detect the area of the FoV of a detected object and map that to a specific configuration of MTM unit cells and/or subarrays to focus the beam, i.e. narrow the beam width. Additionally, in some embodiments, the specific dimensions and other properties of the detected object, such as traveling velocity with respect to the antenna structure, are analyzed and a next action(s) or course of action(s) is determined. The detected object in some embodiments is then provided as a visual or graphic display, which may act as a back-up security feature for the passenger in the vehicle.

Figure 1:
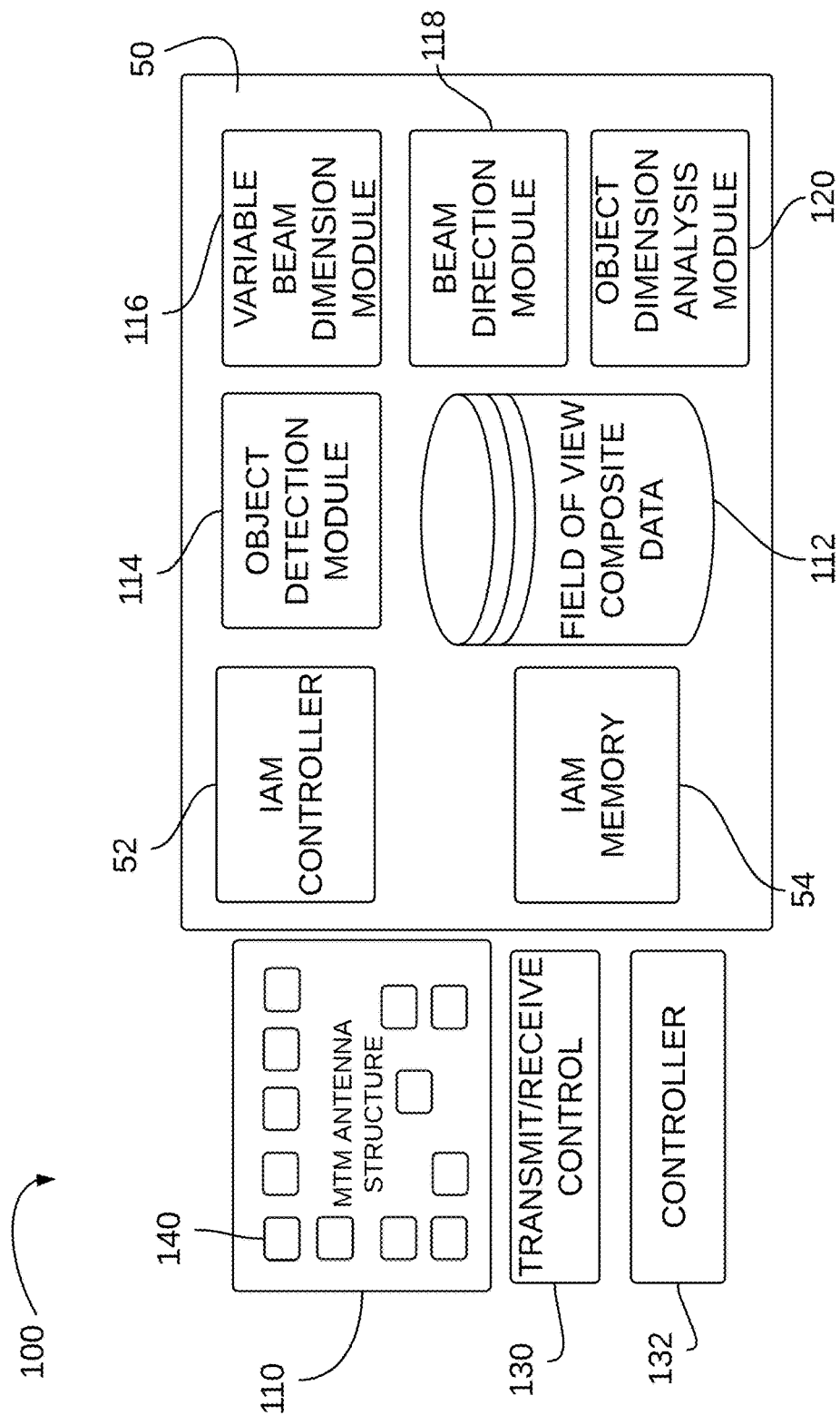
FIG. 1 illustrates a metamaterial antenna system, according to embodiments of the present invention.

FIG. 1 illustrates an antenna system 100 according to various embodiments of the present invention. The system 100 includes an MTM antenna structure 110, which includes multiple MTM unit cells, such as MTM unit cell 140. Each MTM unit cell 140 is an artificially structured element used to control and manipulate physical phenomena, such as electromagnetic (EM) properties of a signal including the amplitude, phase, and wavelength. Metamaterial structures behave as derived from inherent properties of their constituent materials, as well as from the geometrical arrangement of these materials with size and spacing that are much smaller relative to the scale of spatial variation of typical applications. Individual MTM components are considered as unit cells, e.g., MTM unit cell 140. A metamaterial is not a tangible new material, but rather is a geometric design of known materials, such as conductors, that behave in a specific way.

An MTM unit cell, such as cell 140, includes multiple microstrips, gaps and vias, having a behavior that is the equivalent to a combination of series capacitors and shunt inductors. Various configurations, shapes, designs and dimensions are used to implement specific designs and meet specific constraints. The MTM antenna structure 110 may be configured into subarrays, which group unit cells such as cell 140 together. An IAM 50 acts to control the operational parameters of the MTM antenna structure 110. In some embodiments, these parameters include voltages applied to individual MTM unit cells, such as unit cell 140. IAM 50 includes modules and components that capture, measure, store, analyze and provide instructions. The extent of the capabilities of the IAM 50 is strong and flexible; as more and more information is required for an application, the IAM 50 can build additional capabilities. In this way, the IAM 50 is a software programmable module implemented in hardware, having an IAM controller 52 that governs actions within the IAM 50.

In the present embodiment described herein, the application is for an autonomous car, wherein the system 100 is a sensing system that uses radar to identify objects. The use of radar provides a reliable way to detect objects in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the present embodiment, the driver (or driverless car) may maintain the maximum safe speed without regard to the weather conditions. Even if other drivers slow down, the car enabled with the present embodiment will be able to detect those slow-moving cars and obstacles in the way and avoid/navigate around them.

Additionally, in highly congested areas, it is necessary for an autonomous car to detect objects in sufficient time to react and take action. The present invention increases the sweep time of a radar signal so as to detect any echoes in time to react. In rural areas and other areas with few obstacles during travel, the IAM 50 adjusts the focus of the beam to a larger beam width, thereby enabling a faster scan of areas where there are few echoes. The IAM 50 may detect this situation by evaluating the number of echoes received within a given time period and making beam size adjustments accordingly. Once an object is detected, the IAM 50 determines how to adjust the beam focus. This is achieved by changing the specific configurations and conditions of the MTM antenna structure 110. For example, in one scenario the voltages on the varactors are adjusted. In another scenario, a subset of unit cells is configured as a subarray. This configuration means that this set may be treated as a single unit, and all the varactors are adjusted similarly. In another scenario, the subarray is changed to include a different number of unit cells.

All of these detection scenarios, analysis and reactions may be stored in the IAM 50 and used for later analysis or simplified reactions. For example, if there is an increase in the echoes received at a given time of day or on a specific highway, that information is fed into the IAM controller 52 to assist in proactive preparation and configuration of the MTM antenna structure 110. Additionally, there may be some subarray combinations that perform better, such as to achieve a desired result, and this is stored in the IAM memory 54.

In operation, the MTM antenna structure 110 provides radar radiation pattern(s) to scan the FoV of the system 100. In some embodiments, an FoV composite data unit 112 stores information that describes the FoV. This may be historical data used to track trends and anticipate behaviors and traffic conditions or may be instantaneous or real time data that describes the FoV at a moment in time or over a window in time. The ability to store this data enables the IAM 50 to make decisions that are strategically targeted at a particular point or area within the FoV. For example, the FoV may be clear (no echoes received) for five minutes, and then one echo arrives from a specific region in the FoV; this is similar to detecting the front of a car. In response, the IAM 50 may determine to narrow the beam width for a more focused view of that sector or area in the FoV. The next scan may indicate the objects' length or other dimension, and if the object is a car, the IAM 50 may consider what direction the object is moving and focus the beams on that area. Similarly, the echo may be from a spurious object, such as a bird, which is small and moving quickly out of the path of the car. There are a variety of other uses for the FoV composite data 112, including the ability to identify a specific type of object based on previous detection.

The object detection module 114 receives control information from the IAM controller 52, and determines the adjustments, if any, to be made. In some embodiments, the scan begins with a coarse scan having a large bandwidth. On object detection, the beam width narrows. The variable beam dimension module 116 responds to the object detection module 114 and may vary the beam width as quickly or slowly as desired. In some embodiments, the beam width is a binary value, and in others it may take on continuous values. The object detection module 114 instructs the beam direction module 118 where to direct the beam, such as from a subarray. From the received information (echoes) the object dimension analysis module 120 determines parameters and dimensions of the detected object.

Continuing with system 100, the transmit/receive control 130 is controlled by controller 132 and controls the transmit and receive paths to and from MTM antenna structure 110. There may be a portion of the unit cells, such as unit cell 140, that is dedicated to receive, and another portion that is dedicated to transmit, or the MTM antenna structure 110 may be a transmit and receive antenna. In some embodiments, the IAM 50 may allocate specific unit cells, or subarrays, as receive only, transmit only or as transmit and receive. There are any number of combinations and designs for these embodiments.

Figure 2:
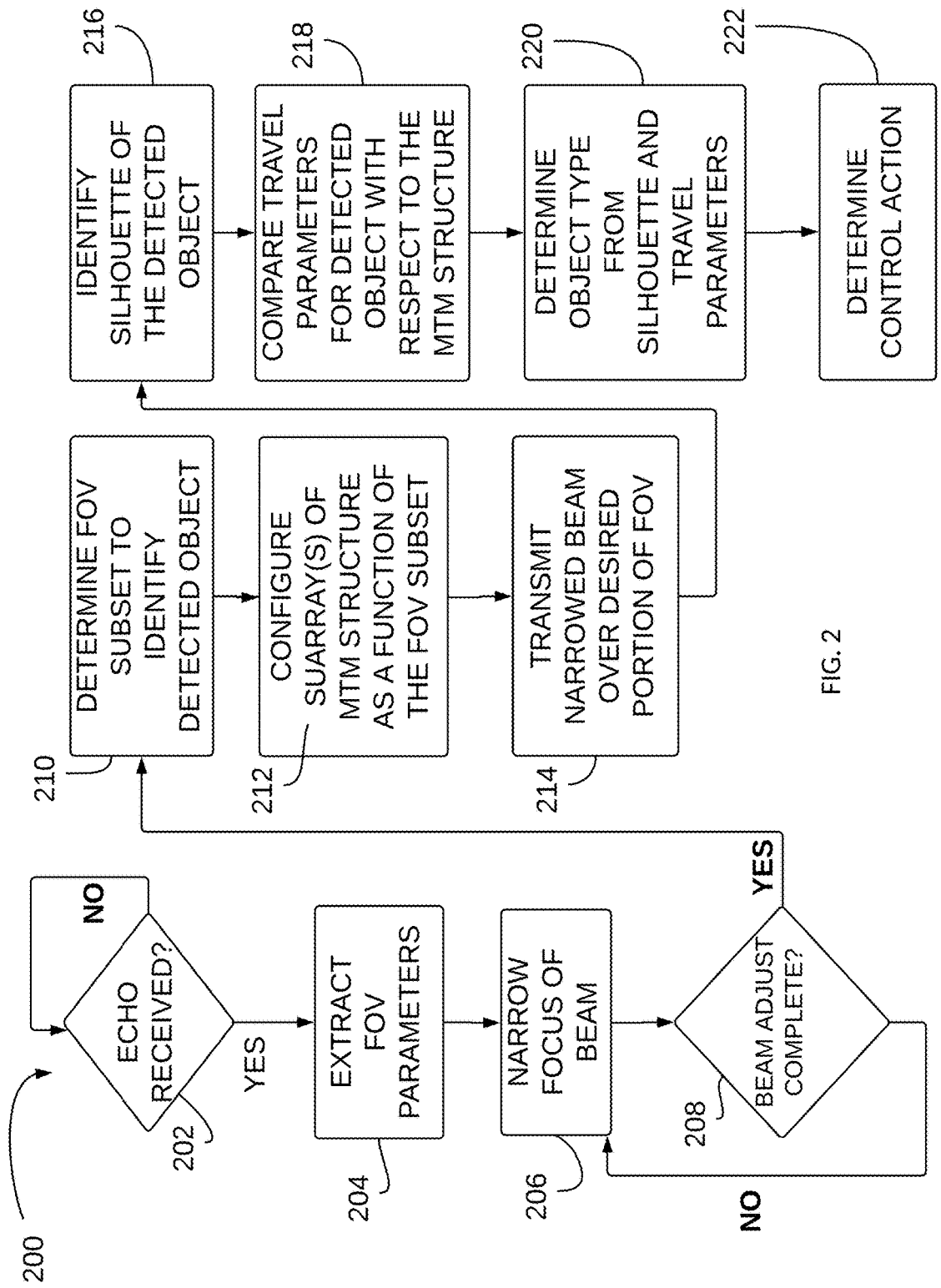
FIG. 2 illustrates a process for controlling the metamaterial antenna system of FIG. 1, according to embodiments of the present invention.

There are many methods that systems that the MTM antenna structure 110 may use with respect to the IAM 50 for applying, embedding, controlling and so forth. An embodiment for dynamic control of the MTM antenna structure 110 is illustrated in FIG. 2. The process 200 begins by system 100 determining if an echo is received by the MTM antenna structure 110, step 202. If so, system 100 extracts the FoV parameters, 204; else the system 100 continues to transmit beams and listen for echoes. The FoV parameters may include the range from the system 100 to the detected object, the speed of the object, the size of the object and so forth, in addition to the direction of arrival of the signals reflected by the object. In the present embodiment, the IAM 50 narrows the focus of the transmission beam, step 206, and then checks to see if the adjustment is sufficient, step 208. The adjustment may require some additional feedback or may be done in one or more steps. The beam is focused to capture more information about the detected object. The IAM 50 then evaluates the FoV to identify where the object is detected, 210. For example, the detected object may be on the right-hand side of the vehicle, it may be at road level and so forth. The IAM 50 then configures a subarray or subarrays of the unit cells in the MTM antenna structure 110 to correspond to the position of the detected object in the FoV, 212. The narrowed beam is transmitted over a desired portion of the FoV, 214. In some embodiments, the process 200 is able to identify a silhouette of the detected object, 216; this may be used to identify a car from a bus, and identify a person from a vehicle, and so forth. Additionally, the process 200 may involve comparing travel parameters of the detected object with respect to the MTM antenna structure 110 to identify an anticipated future location of the object with respect to the MTM antenna structure 110 and the vehicle in which it resides, step 218. The speed and velocity of the detected object enable intelligent control and adjustment of the vehicle's drive path. This is enhanced when the IAM 50 determines an object type from the silhouette data and the travel parameters, 220. From some or all of this information, the IAM 50 provides information to the vehicle controller (not shown), which makes a decision as to how to react, 222.

In some embodiments, process 200 interfaces with a variety of other systems within an application. For example, in a vehicular application, information received at the antenna and the analysis of at least a portion of that data are provided to other modules for processing, such as to a perception layer in an automobile or to a navigation screen.

Figure 3:
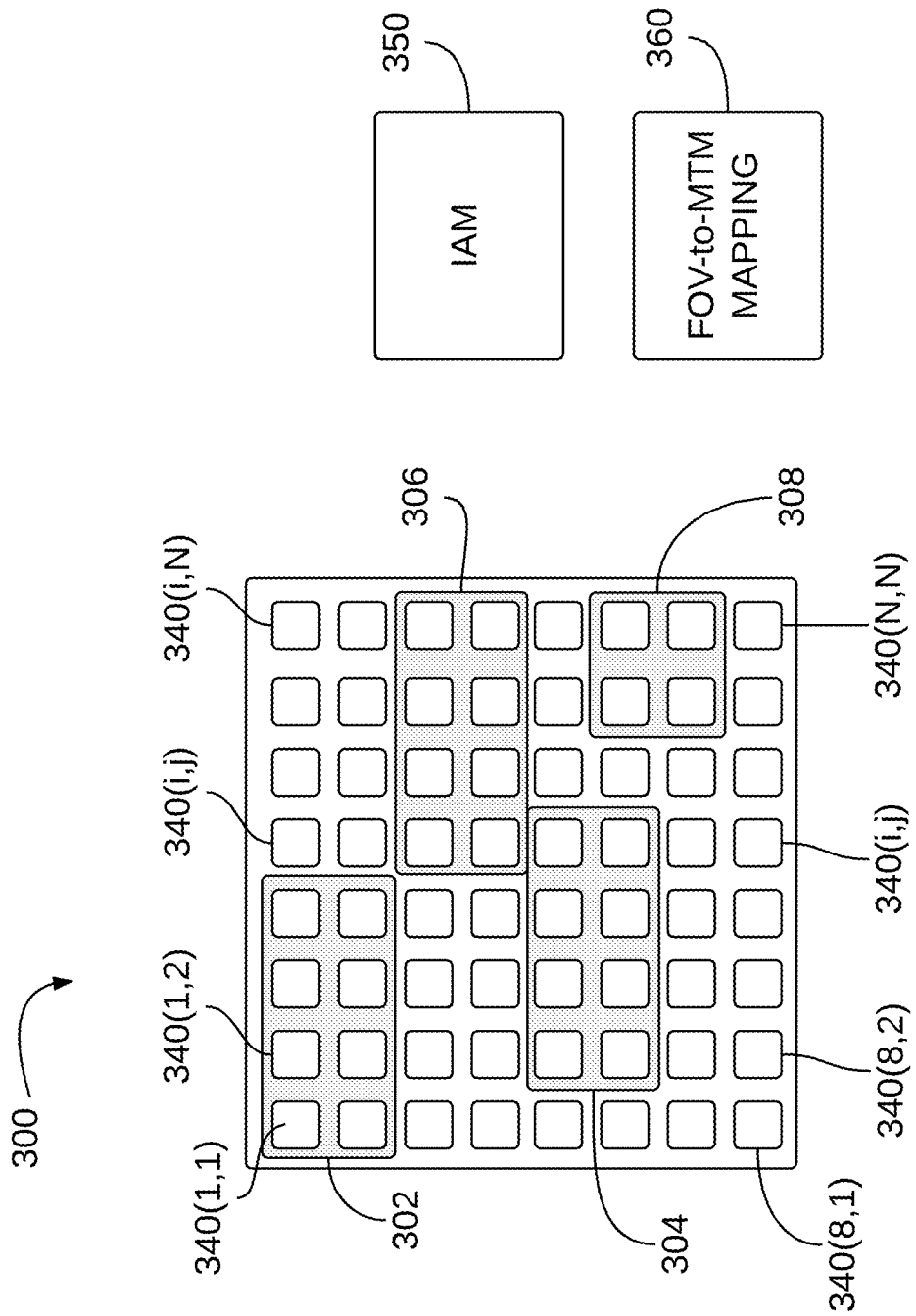
FIG. 3 illustrates a metamaterial antenna system, according to embodiments of the present invention.

FIG. 3 illustrates a metamaterial (MTM) antenna structure 300 (or a portion of a structure) having a plurality of MTM cells arranged in an array of N×N unit cells, wherein for clarity and discussion herein each unit cell is identified by a row, column index (i,j). The array can be an asymmetric N×M array as well. For simplicity, a symmetric N×N case is described. For example, from the viewer's perspective, the unit cell in the upper corner is identified as 340(1,1); and the unit cell in the bottom right is identified as 340(N,N). Other configurations are possible based on the application, structure, physics and goals of the antenna structure, such as structure 300. Antenna structure 300 is part of an antenna system, that includes other modules, some of which are not shown in this drawing. Similarly, the specific shape of the unit cells may take on any of a variety of shapes that result in the characteristics and behavior of metamaterials and are not restricted to square or rectangular or any other regular shape.

Each of the unit cells 340(i,j) in the antenna structure 300 may operate individually or as part of a subarray. As illustrated, the IAM 350 has associated or grouped specific unit cells into sub-arrays 302, 304, 306 and 308. The IAM 350 determines where the radiated beam is to be directed, the shape of the beam and the dimensions of the beam. The beam may be a coarse or large bandwidth beam, a midsized beam or a small, narrow bandwidth beam depending on the situation, the object detected and the timing of the detection, as well as other considerations. The IAM 350 may preconfigure one or more of the subarrays to anticipate a next action, or may use a default configuration, such as to start with a broad bandwidth which enables a faster scan capability or sweep time. For each sweep, the FoV is divided into portions, which may have consistent dimensions, different dimensions or may be dynamically adjusted. In some embodiments, the IAM selects specific directions to have a narrow beam, such as directly in front of the vehicle; other directions, such as on the edges of the FoV may be scanned with a wide beam. These and other design considerations are made by the designer in setting up the IAM 350, wherein some IAM 350 are flexible and configurable. In the illustrated example, the MTM antenna structure 300 has several subarrays that are intended to direct the beam and form the desired radiation pattern.

Once an object is detected, the FoV-to-MTM mapping 360 identifies the portion of the FoV for the IAM 350 and maps that location to a specific MTM unit cell or subarray that will focus on and capture more information about the object. In some embodiments, the IAM 350 has access to various scenarios and may use detected information to predict future conditions on the road. For example, if the MTM antenna structure 300 detects a deer running across the road in an area having a known deer path, the IAM 350 may predict the direction of the deer, as well as anticipate other deer that may follow.

Figure 4:
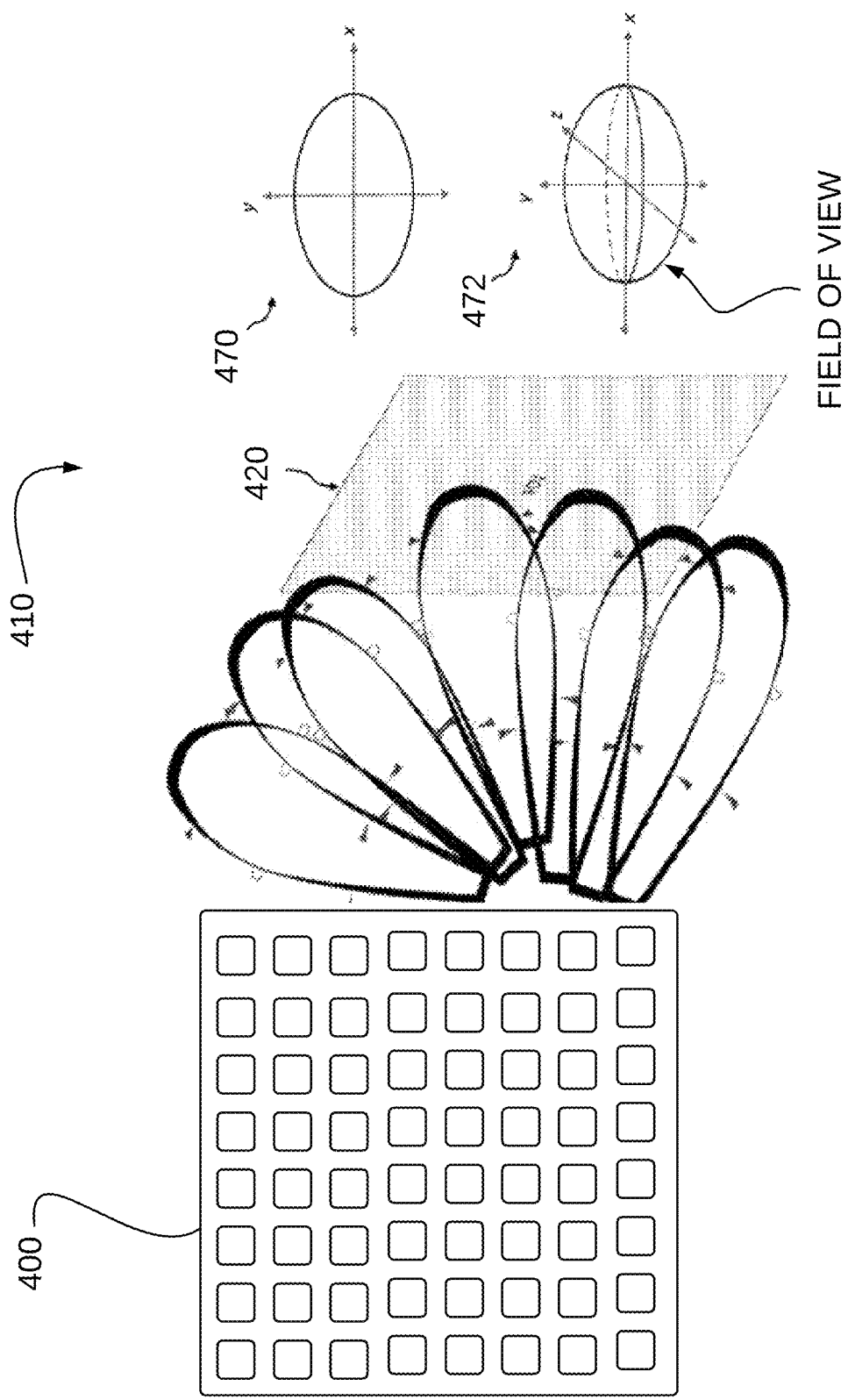
FIG. 4 illustrates radiation patterns in a metamaterial antenna system, according to embodiments of the present invention.

FIG. 4 illustrates operation of an MTM antenna structure 400 having multiple MTM unit cells. The antenna beams are given as examples of a beam sweep 410 from one side of the FoV 420 to the other. Note that the visual field of view and the antenna field of view are not necessarily the same. In this case, the antenna FoV is illustrated as shape 470 in the x and y direction, or 2-D view, and as shape 472, having components in the x, y and z directions, or 3-D view.

Figure 5:
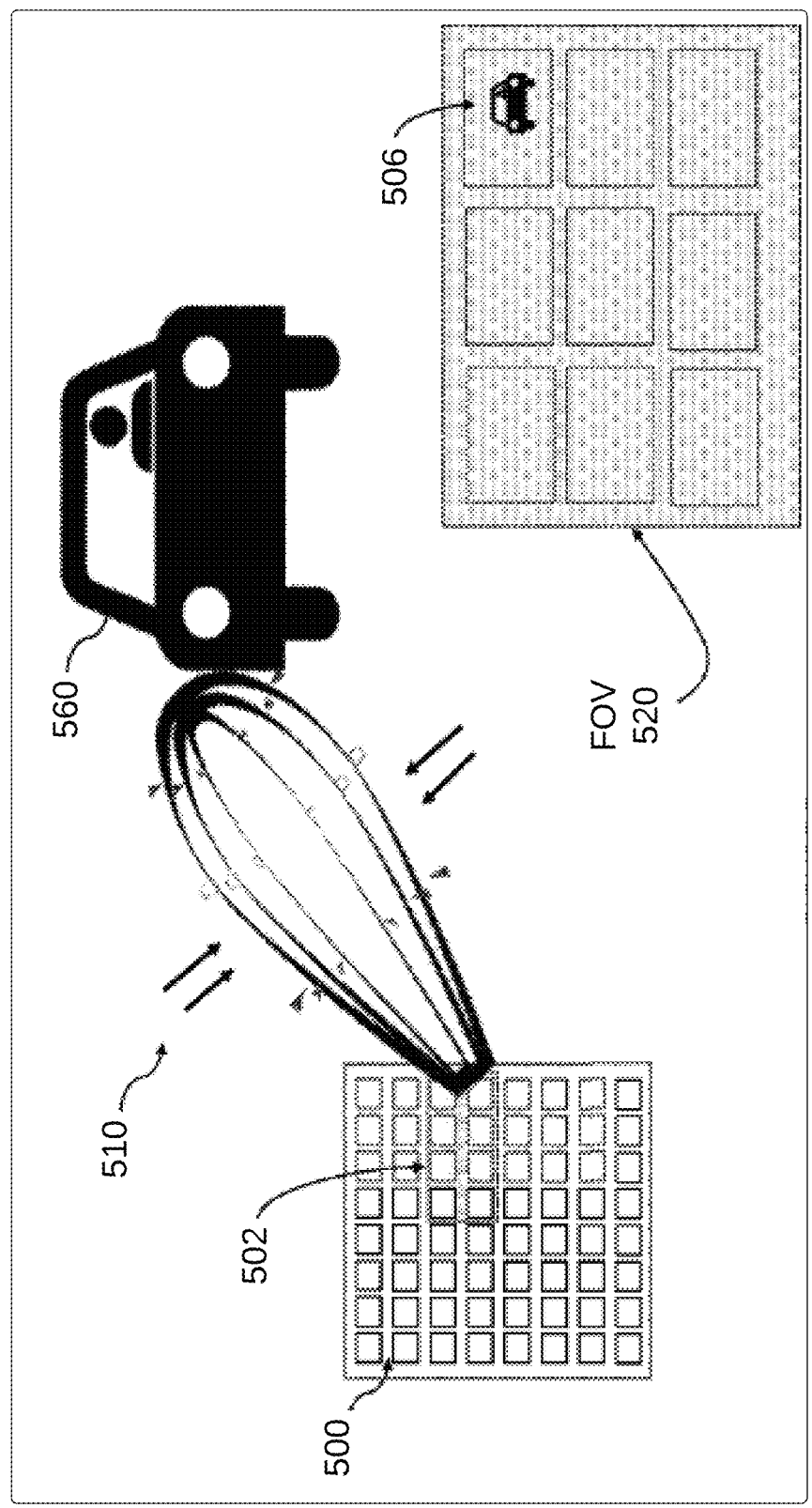
FIG. 5 illustrates operation of a metamaterial antenna system in a vehicular application, according to embodiments of the present invention.

FIG. 5 illustrates an MTM antenna structure 500 having at least one sub-array 502 activated to generate the beam 510. When the car 560 is detected, the IAM (not shown) identifies the associated portion 506 of the FoV 520. This is mapped to the portion of the MTM antenna structure 500 that will generate a focused beam in that area; and that portion is sub-array 502.

Figure 6:
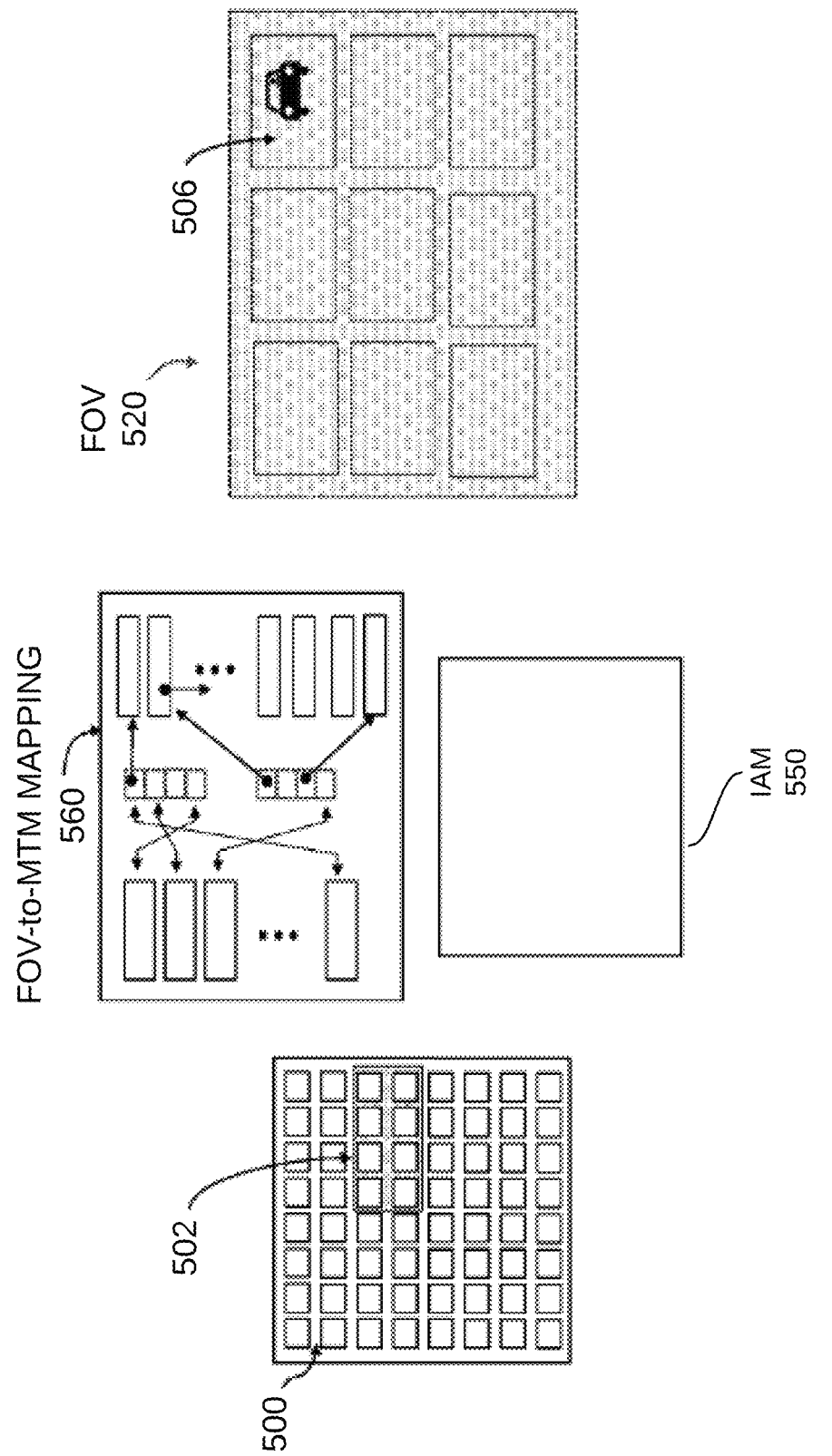
FIG. 6 illustrates a configuration for field of view-to-metamaterial mapping for use in a metamaterial antenna system, according to embodiments of the present invention.

As illustrated in FIG. 6, the mapping between the MTM antenna structure 500 and the FoV 520 is provided by FoV-to-MTM mapping unit 560, which includes various entries for such correlation. This may be a lookup table or other mapping format and may be dynamically adjusted to keep pace with the movement of vehicles; in addition, this information may be stored in a relational database or other device to assist the IAM 550 in learning and improving over time. In this way the IAM 550 may use artificial intelligence (AI), an expert system, a neural network, or other technology to improve performance of the system for object detection.

Figure 7:
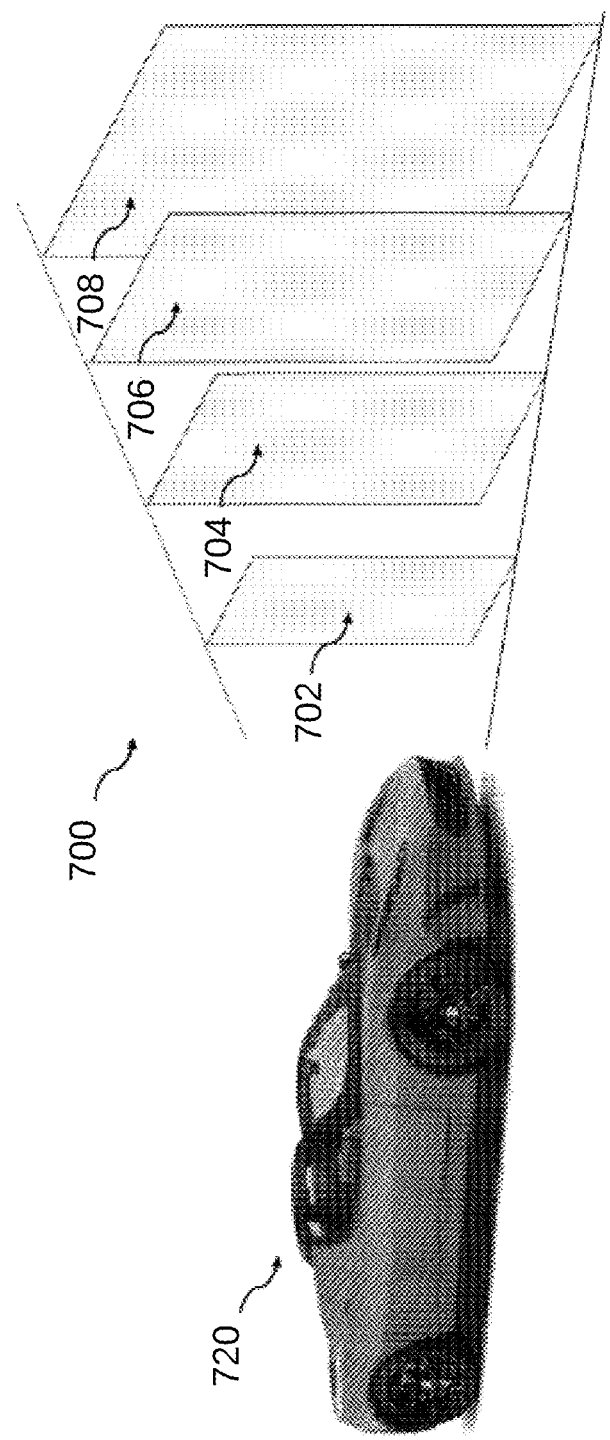
FIG. 7 illustrates the various fields of view corresponding to operation of a metamaterial antenna system, according to embodiments of the present invention.

As a vehicle travels, there are different FoV snapshots or slices, such as from a near-field to a far-field slice. In FIG. 7, from the perspective of the car 720, there is a near-field FoV 702, a far-field FoV 708, and several mid-field slices for the FoV, such as slices 704 and 706. Each slice corresponds to an instant in time as the car 720 travels. The IAM 550 determines which type of beam is broadcast for each FoV as a function of many parameters, including, for example, the speed of the car and the speed of a detected object in relation to the car. The IAM 550 may determine that for specific conditions, the beams are meant to reach a specific FoV, such as where the car is moving slowly, the FoV 702 may be sufficient, but if the car is moving rapidly then there is a desire to reach FoV 708. Weather conditions will have an impact as well, such that if the car will take longer to react, stop or otherwise change the current driving conditions, then the IAM 550 may desire to reach the longest FoV 708 to allow the car time to react. This may be utilized for snow or icy conditions, which dramatically impact how quickly a car may decelerate and/or halt.

As discussed herein, the placement of the MTM antenna structure may be designed and implemented according to the application. FIG. 8 illustrates a few considerations, such as to place an MTM antenna structure 806 in the bumper of truck 800. In this case, the structure 806 is positioned on the side of the bumper, which is not flat but rather is curved. An additional MTM antenna structure 802 is positioned on the side of the truck 804 to improve the detection of driving conditions around the truck.

In some embodiments, a bill board 808 placed along the road has an MTM antenna structure 810 that detects objects traveling along the road. The bill board 808 may have lighting, switched effects, messaging or other power-supplied effects. For power efficiency, the bill board is able to change to a static message that does not use these effects. In some embodiments, the bill board will be able to detect the type of vehicles traveling on a crowded highway and then post an ad that those drivers would like. For example, if there is a faster way to travel for electric vehicles, a bill board may detect times when that lane is empty or sparsely used, while the other lanes are jammed In this case, the bill board 808 may want to advertise electric vehicles. This ability for infrastructure, such as a stationery bill board, to understand what is happening in its vicinity may be enhanced by communicating with specific vehicles or broadcasting a message to all the vehicles. Billboard 930 is a communicative billboard that detects a specific driver via wireless signals with the car but cannot communicate with cars not enabled for such communications. Using an MTM antenna structure, these billboards are able to understand more about their environment.

FIG. 9 illustrates a front bumper 910 of a vehicle where MTM antenna structures are positioned within the bumper and are curved along the side of the bumper, such as MTM antenna structures 912 and 914. In these and other applications an MTM antenna structure may be configured to accommodate the shape of placement, and may be positioned on bumpers, mirror, rooves, and so forth, as determined to best understand the surrounding environment and current conditions.

There may be other sensors that work in collaboration with MTM antenna structures, where each has a special area of detection. In one embodiment shown in FIG. 12, a system 1200 includes an MTM antenna sensor 1202 that works in collaboration with a camera sensor 1204, infrastructure sensors 1206, a laser sensor 1212, operational sensor 1214, user preference sensors 1216, environmental sensor 1218, and a wireless communication module 1208. A sensor fusion controller 1210 controls coordination of the information from sensors 1202, 1204, 1206, 1212, 1214, 1216 and 1218. The IAM 1250 interfaces with these various modules. The camera, or visual, sensor 1204 is adapted for capture of objects, environments, and other elements in the FoV of the sensor 1204. The laser sensor 1212 acts to identify objects, but its performance deteriorates with distance, weather and light inhibiting conditions. The addition of the MTM antenna sensor 1202 provides robust, consistent information when the other types of sensors do not.

Some other considerations for antenna applications, such as for radar antennas used in vehicles, include the antenna design, capabilities, and receiver and transmitter configurations. A typical electronic system with an antenna array consists of two or more antenna elements, beam forming network, and a receiver or transmitter. The beamforming network may consist of a Butler matrix or other antenna arrays combined with phase shifting elements. Many different antenna configurations can be utilized as an antenna element in the antenna array: simple dipole, monopole, printed patch design, Yagi antenna, and so forth. One of the primary goals for antennas mounted on/in the car is to achieve a compact and aesthetic design. Other goals relate to the type of communication signal used for the radar beam. One type of modulation used is Frequency Modulation Continuous Wave (FMCW), which is effective in radar applications, as radar does not need to pulse, but rather transmits continuously. FMCW is a continuous carrier modulated waveform that is transmitted as a continuous periodic function, such as sinusoid, sawtooth, triangular and so forth. The sweep time, or sweep period, $T_s$ is the time for transmission of one period of the waveform. The signal transmitted during one sweep period is referred to as a chirp. There is a difference in the frequency of the transmit and receive signals that is referred to as the beat frequency, $b_f$. The range of the antenna, R, is the distance from the antenna to a detected object, and is a function of the sweep period, beat frequency, the speed of light, c, and the sweep bandwidth, $B_s$. A moving target induces a Doppler frequency shift that enables radar to detect the relative velocity of the target with respect to the antenna. The phase difference between the transmit and receive signals provides location information, while the frequency shift identifies a speed.

In the case of moving objects, the signal phase distortions may impact the performance of the antenna array. One way to offset such distortion is to use multiple subarrays at the Tx and Rx sides to filter out these impurities. Another way is to adjust the antenna calibration on-the-fly to reduce the phase distortion of moving objects.

Traditional phase shifting is used to control the beam of an antenna. Phased array antennas have multiple elements that are fed so as to have a variable phase or time-delay at each element and so that the beam scans from different angles. The multiple elements provide radiation patterns with lower sidelobes and enables careful beam shaping. The beam can be repositioned for more directed and efficient operation.

The present inventions provide an MTM antenna structure that provides phase shifting without the active elements required to change the phase, or in the traditional ways. The MTM antenna structures of various embodiments use the characteristics of the metamaterial shape and configuration to provide phase shift without the use of mechanical or electrical phase shifters.

Figure 10:
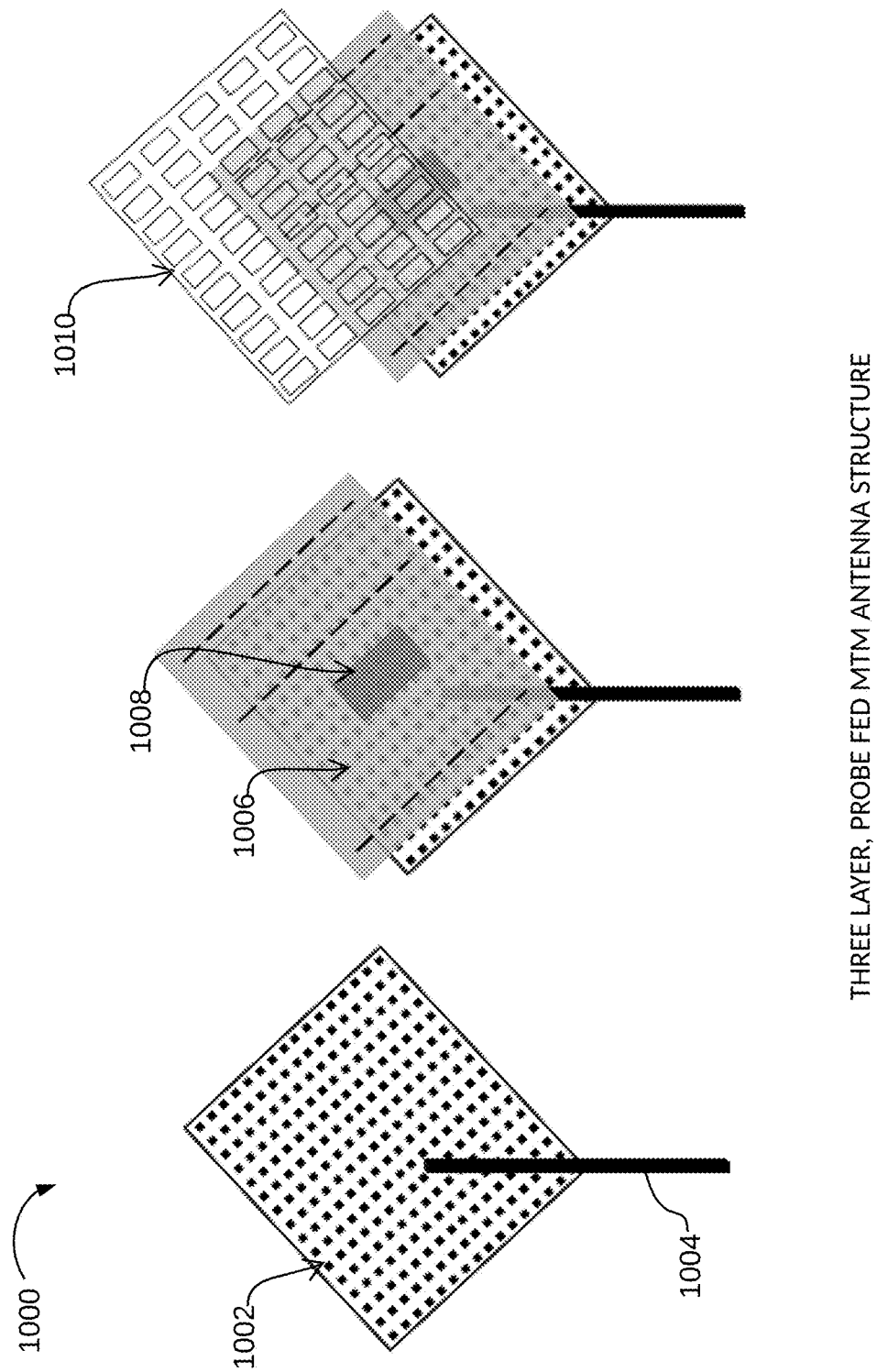

One example of an MTM antenna structure 1000 is illustrated in FIG. 10, where a signal source is provided as a probe 1004 coupled to a ground plane 1002. The probe 1004 supplies the source signal for the antenna 1000 to generate a modulated EM waveform. A second layer 1006 is positioned over the ground plane 1002. The second layer 1006 is made of a dielectric material and has an antenna structure 1008 configured thereon. This antenna 1008 is designed to receive the source signal and generate a relatively flat wave front to meet the MTM layer 1010. The antenna 1008 may be a dipole antenna or any other antenna capable of generating a relatively uniform and flat wave front across the entirety of the second layer 1006.

Another embodiment is illustrated in FIG. 11, which is a two-layer, probe fed MTM antenna structure 1100. As in the example of FIG. 10, a probe 1104 supplies the signal to a ground plane layer 1102. In this embodiment, an MTM antenna structure 1106 is placed over the ground plane with no middle layer. The source signal is distributed across the ground plane 1102 such that a relatively flat wave form is presented to the MTM antenna structure 1106. The MTM antenna structure 1106 then radiates the transmission signal as described herein, wherein each unit cell may transmit individually or transmit as a sub-array.

Figure 12:
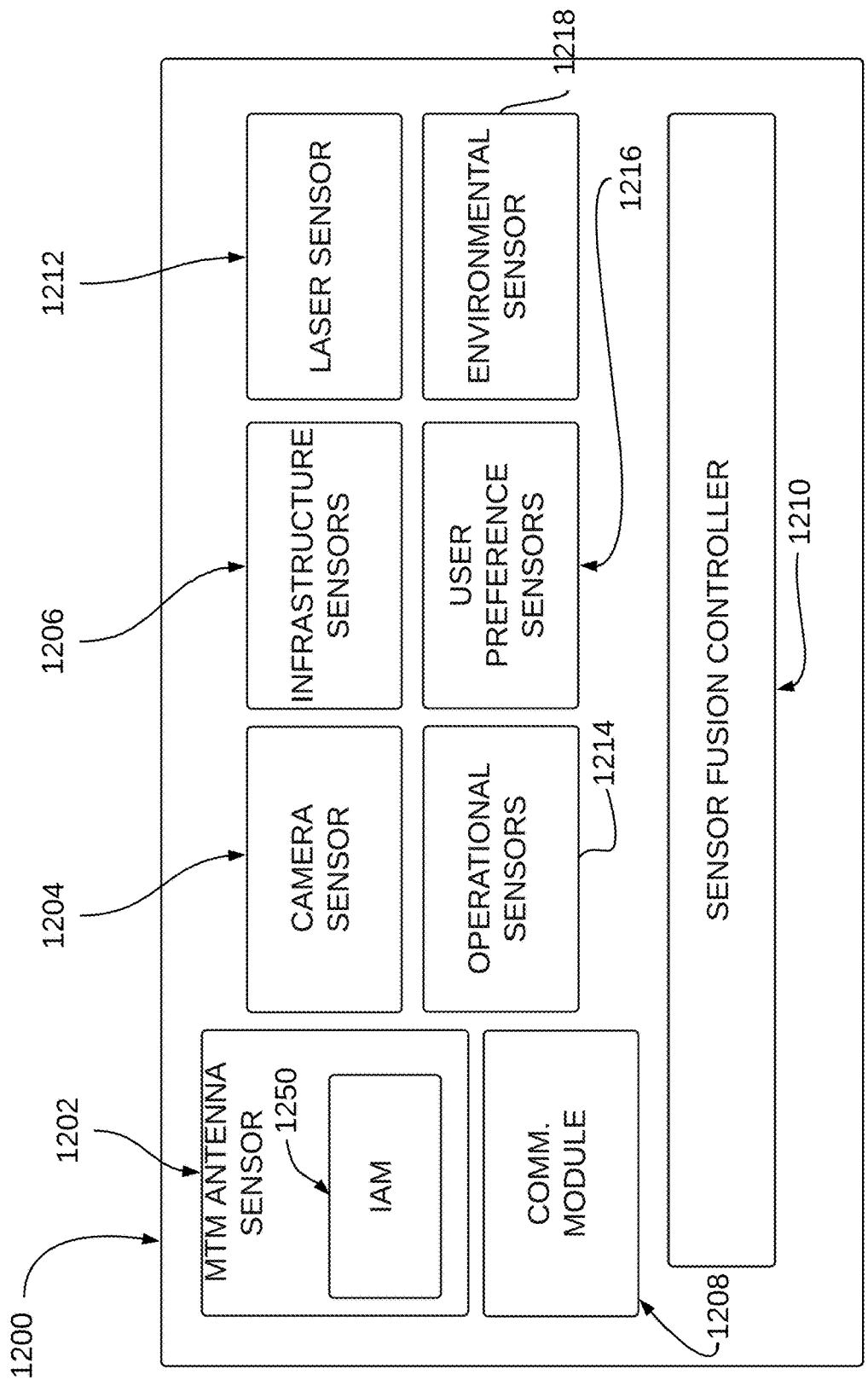
FIG. 12 illustrates a sensor fusion system, according to embodiments of the present invention.

Current technology presents a variety of sensors, such as for an automobile that may include various camera, laser, radar, temperature and other sensors. As shown in FIG. 12, a sensor fusion controller 1210 coordinates and controls operations of the various sensors within the system 1200. An MTM antenna sensor 1202 provides information on objects detected in the automobile's path and may provide pre-information to other sensors that have not yet triggered or detected. This information may assist other modules and controllers within the automobile to prepare for an action. This effectively pre-configures the automobile by the sensor fusion controller 1210.

As illustrated, the system 1200 includes a camera sensor 1204 which will detect visible objects and conditions and is used in rear view cameras that enable the user to better control the vehicle. The camera sensor 1204 may be used for various functions, including some that are invisible to the user, or driver. Infrastructure sensors 1206 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensor 1218 detects various conditions outside, such as temperature, humidity, fog, visibility, precipitation, and so forth. The laser sensor 1212 detects items outside the vehicle and provides this information to adjust control of the vehicle. This information may also provide information such as congestion on a highway, road conditions, and other conditions that would impact the sensors, actions or operations of the vehicle. The sensor fusion controller 1210 optimizes these various functions to provide an approximately comprehensive view of the vehicle and environments.

Continuing with FIG. 12, a communication module 1208 for communication with other vehicles, referred to as V2V communication, is provided. This information may include information invisible to the user, driver, or rider, and may help vehicles coordinate to avoid an accident. Operational sensors 1214 provide information about the functional operation of the vehicle. This may be tire pressure, fuel levels, brake wear, and so forth. The user preference sensors 1216 may be configured to detect conditions that are part of a user preference. This may be temperature adjustments, smart window shading, and so forth.

Many types of sensors may be controlled by the sensor fusion controller 1210. These sensors may coordinate with each other to share information and consider the impact of one control action on another system. In one example, in a congested driving condition, a noise detection module (not shown) may identify that there are multiple radar signals that may interfere with your vehicle. This information may be used by IAM 1250 to adjust the beam size of the MTM antenna sensor 1202 so as to avoid these other signals and minimize interference.

An environmental sensor 1218 may detect that the weather is changing, and visibility is decreasing. In this situation, the sensor fusion controller 1210 may determine to configure the sensors to improve the ability of the vehicle to navigate these new conditions. The actions may include turning off camera or laser sensors or reducing the sampling rate of these visibility-based sensors. This effectively places reliance on the sensor(s) adapted for the current situation. In response, the IAM 1250 configures the MTM antenna sensor 1202 for these conditions as well. For example, the MTM antenna sensor 1202 may reduce the beam width to provide a more focused beam, and thus a finer sensing capability.

In some embodiments, the sensor fusion controller 1210 may send a direct control to the IAM 1250 based on historical conditions and controls. The sensor fusion controller 1210 may also use some of the sensors within system 1200 to act as feedback or calibration for the other sensors. In this way, an operational sensor 1214 may provide feedback to the IAM 1250 and/or the sensor fusion controller 1210 to create templates, patterns and control scenarios. These are based on successful actions or may be based on poor results, where the sensor fusion controller 1210 learns from past actions.

Figure 13:
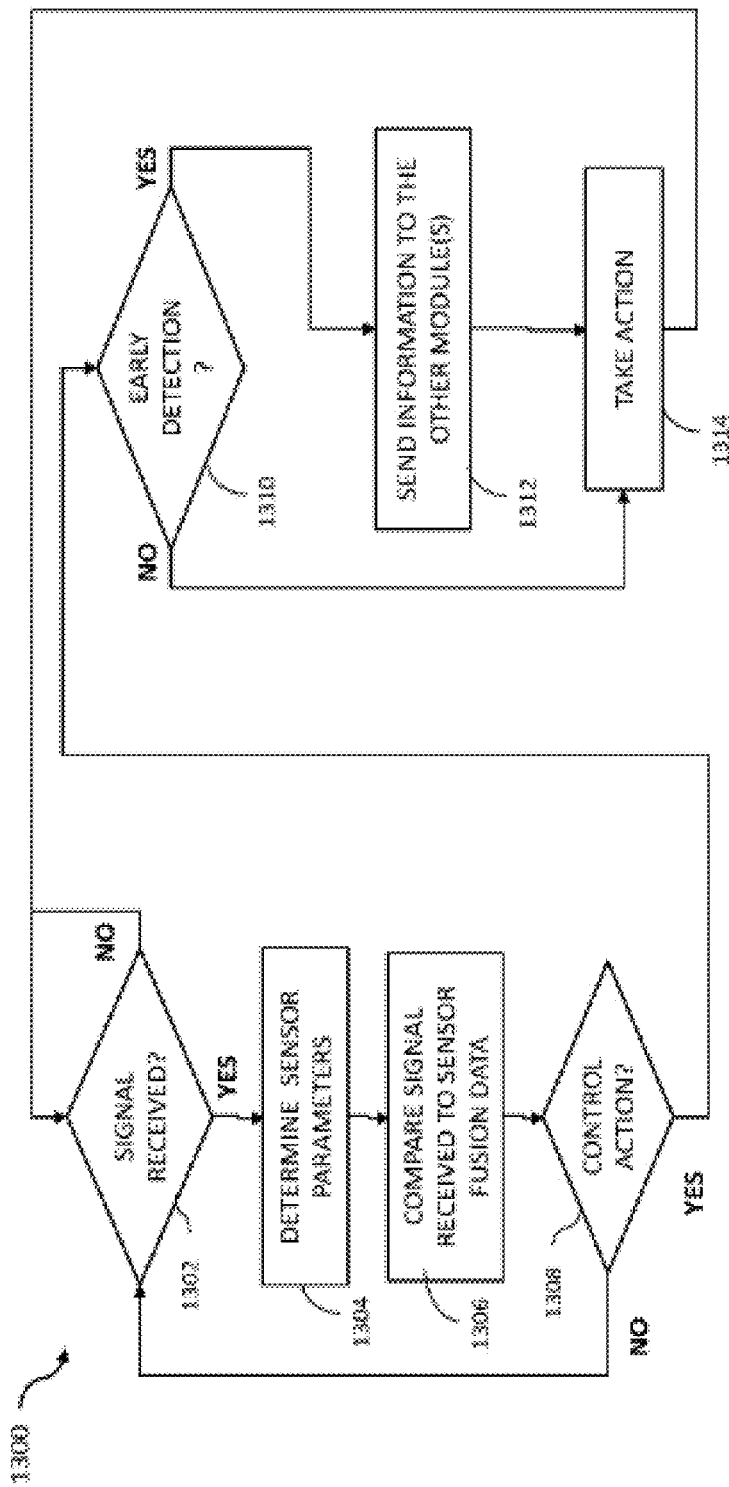
FIGS. 13 and 14 illustrate processes for a sensor fusion system incorporating control by an intelligent antenna metamaterial interface, according to embodiments of the present invention.
Figure 14:
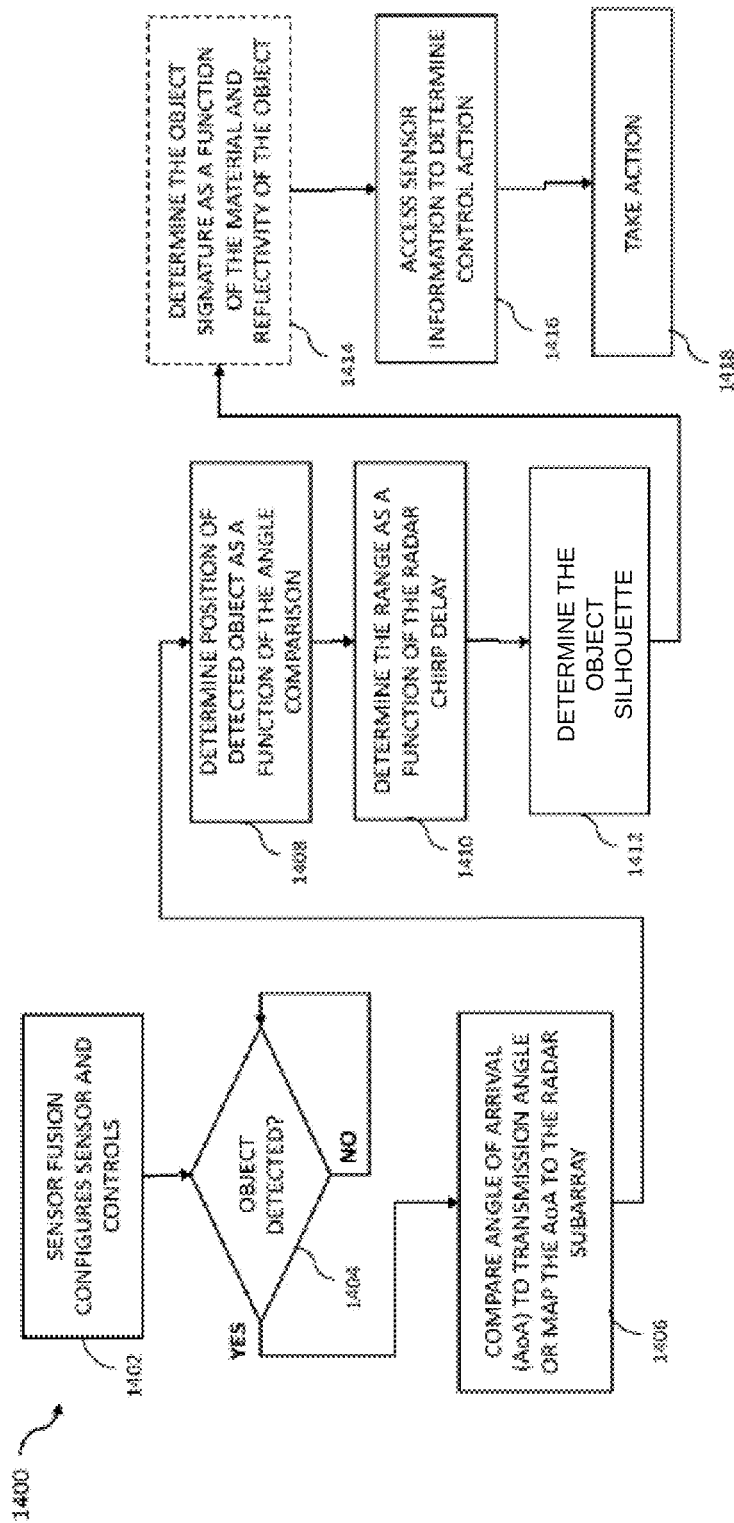

FIGS. 13-14 illustrate processes implemented in the sensor fusion controller 1210, and actions based on sensor readings. In FIG. 13, a process 1300 looks to see if a signal is received from any of the sensors within a system, 1302, such as system 1200 of FIG. 12. If no signal is received, processing continues to listen for sensor signals. When a signal is received, 1302, the sensor fusion controller 1210 determines the sensor parameters, step 1304, which include the information type received from the sensor. This information may be stored for analysis as to actions taken by the vehicle to enable intelligent, flexible, and dynamic control. The process 1300 then continues to compare the signal received to data stored by the sensor fusion controller 1210, step 1306, wherein such data may be stored in memory (not shown) or stored in a networked repository, such as a cloud database and system (not shown). At this point, if a control action is indicated at 1308, processing continues to determine if this control action and/or the information received from the sensor will provide early detection for this or another action. This early detection check, step 1310, allows the entire sensor ecosystem to take advantage of information from any of the sensors in the system 1200. If the sensor information may be used for early detection, step 1310, then the information is sent to one or more modules, step 1312, or is stored in memory as a data point in the current scenario. The system them takes the indicated action, step 1314, and returns to listen for signals at 1302. If the information is not used for early detection at 1310, then processing continues to take the indicated action at 1314. If no control action is indicated at 1308, processing returns to listen for sensor signals.

FIG. 14 illustrates another process 1400 according to some embodiments, wherein the sensor fusion controller 1210 configures sensors and controls for operation at 1402. This may be a dynamic step or may be a persistent configuration. When an object is detected by the MTM antenna sensor 1202 at step 1404, the process 1400 uses that information to calculate or determine specifics relating to the object with respect to the antenna position. The angle of arrival (AoA) is compared to the transmission angle or is mapped to a subarray in the MTM antenna sensor, 1406. This information is used to determine the position of the detected object in 2-D or 3-D space, 1408. The range, or distance from the antenna to the object, is a function of the radar chip delay, 1410. The information from the MTM antenna sensor 1202 and other sensors is used to determine a silhouette and/or footprint of the object, 1412. Optionally, information from the sensor(s) may provide an object signature of the object, 1414, depending on material and so forth. This may be an indication of the reflectivity of the object. The object signature is a more detailed understanding of the object, which may give dimensions, weight, and so forth. The sensor fusion controller 1210 will access sensor information to determine a control action, 1416, and instruct to take action, 1418.

A variety of information is determined from the MTM antenna sensor 1202; such information may be a function of the modulation waveform and technique, the frequency, the chirp delay, the frequency change of the received signal and so forth. The specific radiation pattern used may be crafted to accomplish specific goals according to the application. The sensor fusion controller 1210 enables such control to optimize the system and reduce the processing required. For example, the MTM antenna sensor 1202 may be used to reduce the number of sensor and/or the active time of each sensor. In this way, some sensors may be disabled during certain conditions, and activated on a change in that condition.

Figure 15:
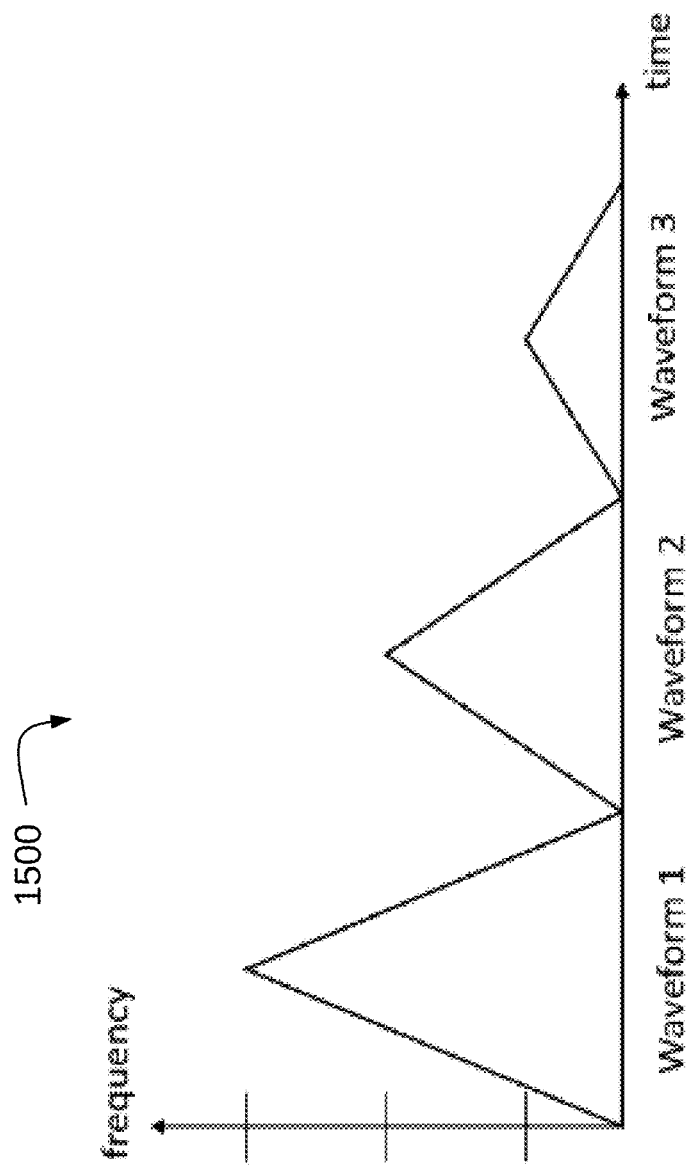
FIG. 15 illustrates a radiation pattern for multi-range object detection, according to embodiments of the present invention.

In one scenario, the MTM antenna sensor 1202 may be used in place of other object-detection sensors, wherein the radiated waveform is transmitted as an FMCW signal, and the frequency is modified so as to capture data in near field, mid-range and far field. FIG. 15 illustrates a waveform 1505, wherein the amplitudes of waveform 1, waveform 2 and waveform 3 differ over time.

The invention claimed is:

1. An antenna structure, comprising:
   a ground plane layer;
   a dielectric layer positioned above the ground plane layer and having a radiating structure; and
   a metamaterial layer positioned above the dielectric layer, wherein the metamaterial layer comprises an array of metamaterial unit cells configurable into subarrays,
   wherein a subarray is changed to comprise a different number of metamaterial unit cells in response to a detected object.

2. The antenna structure as in claim 1, wherein the radiating structure is to generate a wave front across the dielectric layer to meet the metamaterial layer.

3. The antenna structure as in claim 1, wherein the controller configures the subarrays for multiple transmission beams.

4. The antenna structure as in claim 1, further comprising an antenna probe feed structure coupled to the ground plane layer.

5. The antenna structure as in claim 4, wherein the antenna probe feed structure supplies an input signal to generate the wave front.

6. The antenna structure as in claim 1, wherein each metamaterial unit cell in the array of metamaterial unit cells radiates the input signal individually.

7. The antenna structure as in claim 1, wherein the at least one metamaterial unit cell comprises a metamaterial shape and configuration to provide a phase shift.

8. The antenna structure as in claim 1, wherein the at least one metamaterial unit cell comprises at least one controllable operational parameter to adjust a beam focus based on the field of view of the antenna structure.

9. The antenna structure as in claim 1, wherein the antenna structure is coupled to a plurality of sensors for control of a vehicle.

10. The antenna structure as in claim 9, wherein the plurality of sensors comprises at least one of a camera sensor, a laser sensor, an operational sensor, an infrastructure sensor, a user preference sensor, and an environmental sensor.

11. An antenna structure in a vehicle, comprising:
    a signal source;
    a ground plane layer;
    a dielectric layer positioned above the signal source and the ground plane layer; and
    a metamaterial layer positioned above the dielectric layer to radiate a signal received from the signal source, the metamaterial layer comprising a plurality of metamaterial unit cells configurable into a plurality of subarrays,
    wherein a subarray from the plurality of subarrays is changed to comprise a different number of metamaterial unit cells based on an object detected in a path of the vehicle.

12. The antenna structure as in claim 11, wherein the antenna structure is coupled to an Intelligent Antenna Metamaterial Interface ("IAM") structure to control operational parameters of the antenna structure, the operational parameters comprising at least a set of voltages applied to the plurality of metamaterial unit cells.

13. The antenna structure as in claim 12, wherein the IAM structure comprises an object detection module to detect the object in the path of the vehicle, the IAM structure to configure at least one of the plurality of subarrays to adjust a beam based on the position of the detected object.

14. The antenna structure as in claim 11, wherein the plurality of subarrays comprises a plurality of subarrays configurable based on a direction the object is moving.

15. The antenna structure as in claim 11, wherein the plurality of subarrays are preconfigured to anticipate a next action.

16. An antenna system in a vehicle comprising:
    an antenna structure comprising:
      a signal source;
      a ground plane layer;
      a dielectric layer positioned above the signal source and the ground plane layer; and
      an array of metamaterial unit cells positioned above the dielectric layer, the array of metamaterial unit cells configurable into a plurality of subarrays; and
    a controller coupled to the antenna structure to control a beam width of a signal radiated from the plurality of subarrays based on a received echo,
      wherein a subarray from the plurality of subarrays is changed to comprise a different number of metamaterial unit cells based on an objected detected in a path of the vehicle.

17. The antenna system as in claim 16, wherein the controller is to preconfigure at least one subarray in the plurality of subarrays to radiate a signal with a preconfigured beam width based on a sweep time for the antenna structure.

18. The antenna system as in claim 16, wherein the controller is to change the beam width of the radiated signal based on changing weather and visibility conditions.

* * * * *